United States Patent
Nishizawa et al.

(10) Patent No.: US 11,408,721 B2
(45) Date of Patent: Aug. 9, 2022

(54) ROTATION ANGLE DETECTION DEVICE AND ROTATION ANGLE DETECTION METHOD

(71) Applicant: Mitsubishi Electric Corporation, Tokyo (JP)

(72) Inventors: Koji Nishizawa, Tokyo (JP); Yoshihiro Miyama, Tokyo (JP); Tatsuo Nishimura, Tokyo (JP); Hideaki Arita, Tokyo (JP); Masaya Inoue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 540 days.

(21) Appl. No.: 16/342,066

(22) PCT Filed: Oct. 31, 2016

(86) PCT No.: PCT/JP2016/082269
§ 371 (c)(1),
(2) Date: Apr. 15, 2019

(87) PCT Pub. No.: WO2018/078856
PCT Pub. Date: May 3, 2018

(65) Prior Publication Data
US 2021/0310784 A1    Oct. 7, 2021

(51) Int. Cl.
*G01B 7/30* (2006.01)
*G01D 5/14* (2006.01)

(52) U.S. Cl.
CPC .............. *G01B 7/30* (2013.01); *G01D 5/145* (2013.01)

(58) Field of Classification Search
CPC .................. G01B 7/30; G01D 5/145
See application file for complete search history.

(56) References Cited

U.S. PATENT DOCUMENTS

| | | | |
|---|---|---|---|
| 5,450,009 A | 9/1995 | Murakami | |
| 8,836,324 B2 * | 9/2014 | Loreit | G01D 5/147 324/207.21 |
| 10,852,163 B2 * | 12/2020 | Isoda | G01D 5/147 |

FOREIGN PATENT DOCUMENTS

| JP | 4-94582 U | 8/1992 |
|---|---|---|
| JP | 8-219709 A | 8/1996 |

(Continued)

OTHER PUBLICATIONS

Communication dated Jan. 21, 2020, from the Japanese Patent Office in Application No. 2018-547081.

(Continued)

*Primary Examiner* — Reena Aurora
(74) *Attorney, Agent, or Firm* — Sughrue Mion, PLLC; Richard C. Turner

(57) ABSTRACT

A rotation angle detection device, including: a rotor; a stator including one bias magnetic field generation portion (BMFGP) and magnetic detection elements; and a rotation angle calculation processor calculating a rotation angle of the rotor from detection signals of the detection elements, wherein a surface of the rotor has convex and concave portions (CCPs), which change in "x" ("x"≥1) cycles for a mechanical angle of 360, and a shape of the CCPs make the detection elements possible to obtain a sine wave, and wherein "a" ("a"≥2) detection elements are arranged along a circumferential direction of the stator at equal intervals for one cycle of the CCPs—so as to be opposed to the surface of the rotor, and the BMFGP extends in the circumferential direction for one cycle of the CCPs so as to overlap with the "a" detection elements.

20 Claims, 7 Drawing Sheets

(56) References Cited

FOREIGN PATENT DOCUMENTS

| | | |
|---|---|---|
| JP | 11-51695 A | 2/1999 |
| JP | 2004-184115 A | 7/2004 |
| JP | 2006-132978 A | 5/2006 |
| JP | 2006-329888 A | 12/2006 |
| JP | 2008-29070 A | 2/2008 |
| JP | 2008-209340 A | 9/2008 |
| JP | 2013-61346 A | 4/2013 |
| JP | 2016-020819 A | 2/2016 |
| WO | 2016/069254 A1 | 5/2016 |

OTHER PUBLICATIONS

Communication dated Jul. 21, 2020, from the Japanese Patent Office in application No. 2018-547081.
Communication dated Feb. 2, 2021 from the Japanese Patent Office in Application No. 2018-547081.
International Search Report for PCT/JP2016/082269 dated, Jan. 24, 2017 (PCT/ISA/210).
Office Action dated Apr. 7, 2022 in German Application No. 112016007397.6.

* cited by examiner

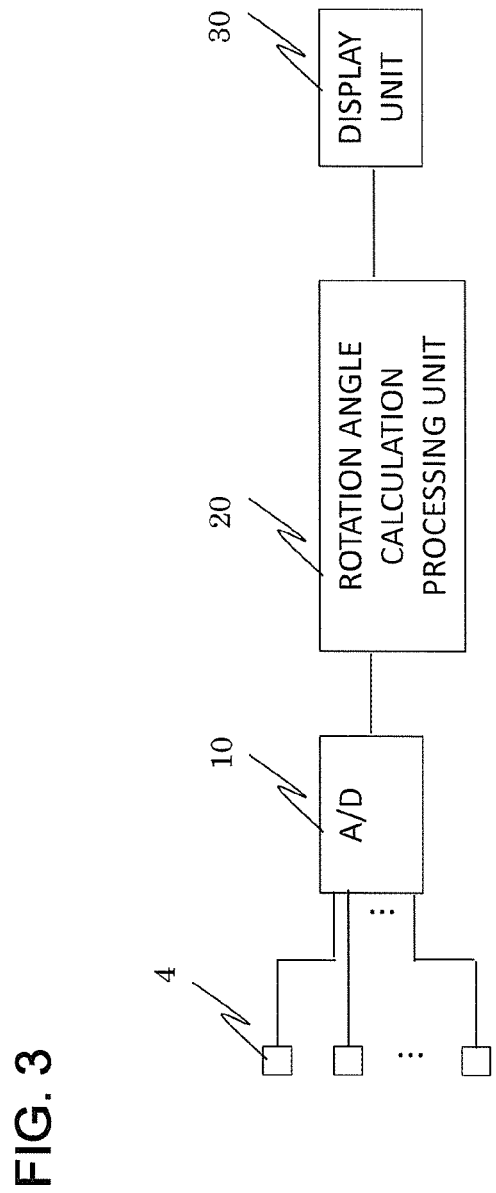

ROTATION ANGLE DETECTION DEVICE AND ROTATION ANGLE DETECTION METHOD

CROSS REFERENCE TO RELATED APPLICATIONS

This application is a National Stage of International Application No. PCT/JP2016/082269 filed Oct. 31, 2016.

TECHNICAL FIELD

The present invention relates to a rotation angle detection device, and more particularly, to a rotation angle detection device and a rotation angle detection device method, which use a change in magnetic intensity.

BACKGROUND ART

For example, in Patent Literature 1, there is disclosed a rotation detection device including: a rotor, which is provided to a rotary shaft supported by a housing including a bearing and configured to rotate, and rotation of which is to be detected; a semiconductor chip including a magnetic sensing element configured to sense a change in magnetic field in a vicinity of the rotor; and a bias magnet configured to apply a bias magnetic field to the magnetic sensing element, the rotation detection device being configured to detect a rotation mode of the rotor by sensing, with the magnetic sensing element, a change in magnetic field caused in association with the bias magnetic field when the rotor is rotated, the bearing and the semiconductor chip being formed integrally with the housing. Further, in Patent Literature 2 and Patent Literature 3, there are also disclosed a rotation detection device and a rotation detection sensor, which use a change in magnetic intensity.

CITATION LIST

Patent Literature

[PTL 1] JP 2006-132978 A
[PTL 2] JP 11-51695 A
[PTL 3] JP 08-219709 A

SUMMARY OF INVENTION

Technical Problem

For example, in the rotation detection device of Patent Literature 1, rectangular-shaped protrusions and recesses are formed along an outer peripheral surface of the rotor, and the rotation is detected by sensing, with the magnetic sensing element, a change in magnetic field caused in association with the bias magnetic field due to those protrusions and recesses.

It is an object of the present invention to provide a rotation angle detection device and the like for highly accurately detecting a rotation angle by forming, on a side of a rotor for which the rotation angle is to be measured, convex and concave portions, which change in a curved manner, smoothly, and periodically as in a sine wave, and detecting, with a plurality of magnetic detection elements, a change in magnetic field caused in association with a bias magnetic field due to those protrusions and recesses, which change smoothly and periodically.

Solution to Problem

According to one embodiment of the present invention, there are provided a rotation angle detection device and the like, including: a rotor made of a magnetic material; a stator including one bias magnetic field generation portion and a plurality of magnetic detection elements; and a rotation angle calculation processing unit configured to calculate a rotation angle of the rotor based on detection signals obtained by the plurality of magnetic detection elements, wherein a surface of the rotor that is opposed to the stator has convex and concave portions, which change in "x" cycles for a mechanical angle of 360 degrees, where "x" represents an integer of 1 or more, and the convex and concave portions have a shape that changes in a curved manner, the shape enabling each of the plurality of magnetic detection elements to obtain a substantially sine wave, and wherein "a" magnetic detection elements of the stator are arranged along a circumferential direction of the stator at equal intervals for one cycle of the convex and concave portions so as to be opposed to, with a gap from, the surface of the rotor that is opposed to the stator, and the one bias magnetic field generation portion extends in the circumferential direction for one cycle of the convex and concave portions so as to overlap with the "a" magnetic detection elements, where "a" represents an integer of 2 or more.

Advantageous Effects of Invention

According to the embodiments of the present invention, it is possible to provide the rotation angle detection device and the like for highly accurately detecting a rotation angle by detecting, with the plurality of magnetic detection elements, a change in magnetic field caused in association with the bias magnetic field due to the convex and concave portions, which are formed on the rotor side and change in a curved manner, smoothly, and periodically as in a sine wave.

BRIEF DESCRIPTION OF DRAWINGS

FIG. 3 is a configuration diagram of a rotation angle calculation unit of the rotation angle detection device according to one embodiment of the present invention.

DESCRIPTION OF EMBODIMENTS

Now, a rotation angle detection device and the like according to each of embodiments of the present invention are described with reference to the drawings. In each of the embodiments, the same or corresponding portions are denoted by the same reference symbols, and the overlapping description thereof is omitted.

First Embodiment

Figure 1:
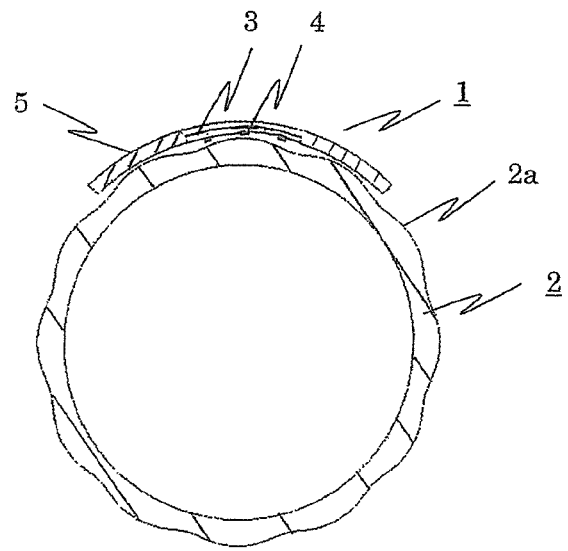
FIG. 1 is a schematic sectional view of a detection unit of a rotation angle detection device according to one embodiment of the present invention.

FIG. 1 is a schematic sectional view of a detection unit of the rotation angle detection device according to one embodiment of the present invention. A stator 1, which includes a magnetic material 5, a bias magnetic field generation portion 3, and a plurality of magnetic detection elements 4, is arranged to a part of an outer periphery of the rotor 2, the rotation angle of which is to be detected. On a surface of the rotor 2 that is opposed to the stator, for example, an outer peripheral surface of the rotor 2, convex and concave portions 2a are formed. The convex and concave portions 2a have a shape that changes in a curved manner, which enables each of the magnetic detection elements 4 to obtain a substantially sine wave. In FIG. 1, x=12, that is, twelve convex and concave portions 2a are formed, and hence when the rotor 2 has rotated by a mechanical angle of 360 degrees, that is, has rotated once, waveforms corresponding to twelve cycles are obtained from each of the magnetic detection elements 4. In FIG. 1, for example, three magnetic detection elements 4 are arranged for each cycle of the convex and concave portions 2a. Further, for one cycle of the convex and concave portions 2a, three magnetic detection elements 4 are arranged at substantially the same intervals, and hence when it is assumed that one cycle of the convex and concave portions 2a is 360 degrees, signals with a phase difference of 120 degrees are output from the three magnetic detection elements 4.

It is only required that the convex and concave portions 2a have "x" cycles for the mechanical angle of 360 degrees, and "x" represents an integer of 1 or more.

Figure 2A:
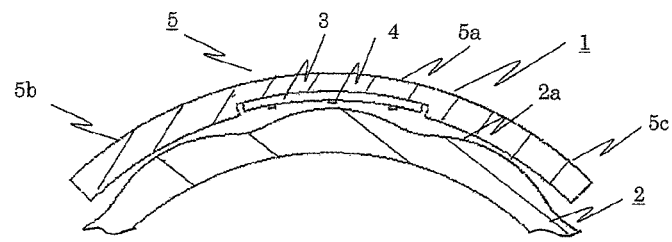
FIG. 2A and FIG. 2B are enlarged cross-sectional views of a main part of the detection unit of FIG. 1.
Figure 2B:
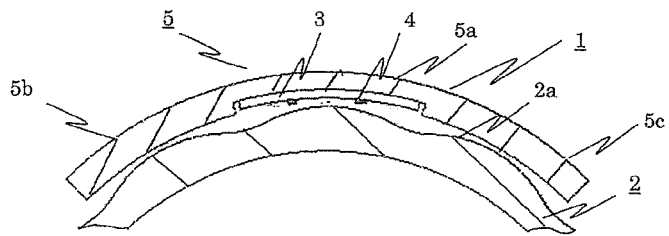

FIG. 2A and FIG. 2B are each an enlarged cross-sectional view of a main part of the detection unit of FIG. 1. In FIG. 2A, a case in which a=3, that is, three magnetic detection elements 4 are arranged is illustrated. In FIG. 2B, a case in which a=2, that is, two magnetic detection elements 4 are arranged is illustrated. An inner-rotor structure, in which the rotor 2 is arranged inside, is used, and hence the magnetic detection elements 4 are arranged on an inner periphery of the bias magnetic field generation portion 3. Further, on an outer periphery of the bias magnetic field generation portion 3 and outer sides thereof in the circumferential direction, the magnetic material 5 for increasing an amount of magnetic flux to be detected by the magnetic detection elements 4 is arranged.

It is only required that "a" magnetic detection portions 4 be arranged for one cycle of the convex and concave portions 2a, and "a" represents an integer of 2 or more.

In addition, the magnetic material 5 is only required to be provided as required by a magnetic path configuration. In some cases, magnetic flux from a magnet does not reach the rotor but returns to the magnetic material 5 depending on a magnetic path configuration, and hence whether to provide the magnetic material 5 depends on the design of a magnetic circuit. However, through provision of the magnetic material 5, the provided magnetic material may have an effect of shielding an influence from a magnetic field applied from the outside, for example, a magnetic field due to a coil of a motor. Thus, as long as the magnetic material 5 can be provided without a problem as a magnetic design, the magnetic material 5 can be provided as a shielding material without a problem.

FIG. 3 is a configuration diagram of a rotation angle calculation unit of the rotation angle detection device according to one embodiment of the present invention. The detection signal from each of the magnetic detection elements 4 is subjected to A/D conversion in an A/D conversion unit 10, and then the resultant signal is input to a rotation angle calculation processing unit 20. In the rotation angle calculation processing unit 20, rotation angle calculation is performed based on the detection signals, and the calculated rotation angle is displayed on, for example, a display unit 30.

Figure 4:
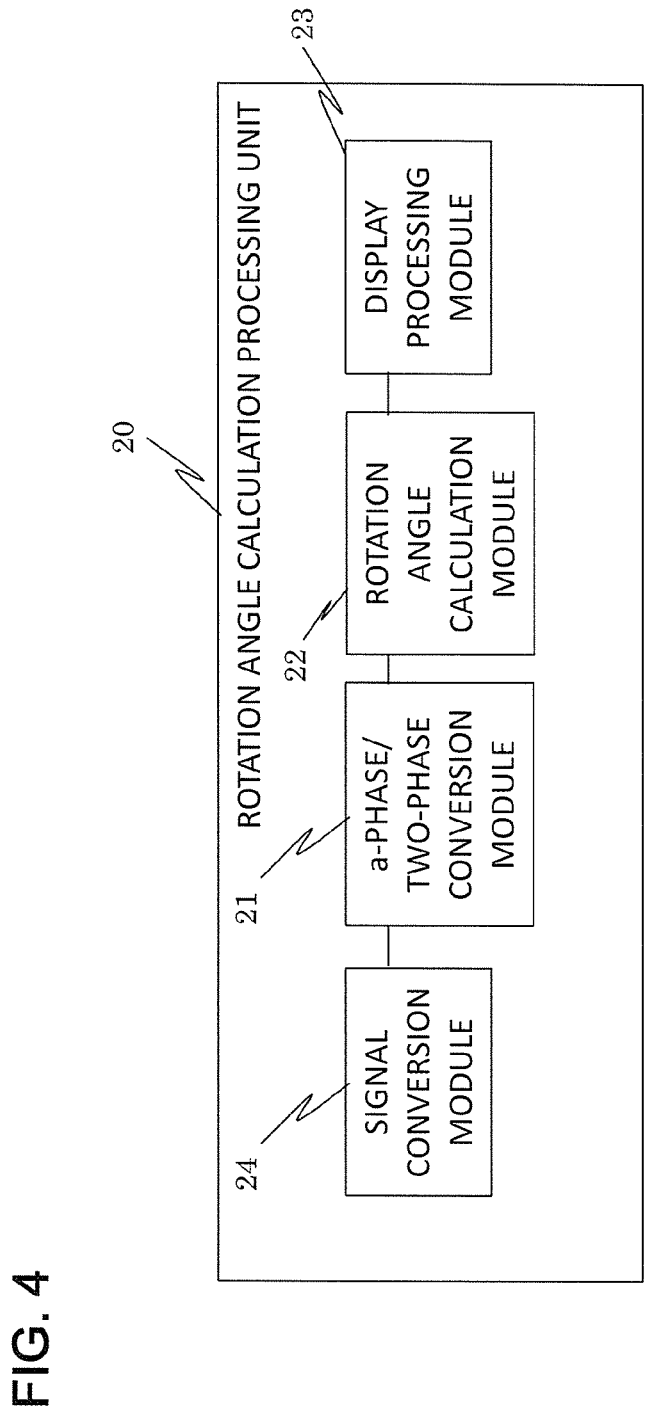
FIG. 4 is a diagram for illustrating an example of a functional block diagram of the rotation angle calculation processing unit of FIG. 3.

FIG. 4 is a diagram for illustrating an example of a functional block diagram of the rotation angle calculation processing unit of FIG. 3. A signal conversion module 24 removes a DC offset component, which is a DC component of a magnetic field generated by a bias magnetic field. In this case, the DC offset is subjected to, for example, waveform averaging processing to calculate a DC offset amount, and the DC offset amount is subtracted from each phase signal, to thereby remove a DC offset. For example, in a case of three-phase signals, a DC offset component may be obtained by dividing a sum of phase signals by 3, and the DC offset component may be subtracted from each phase signal. As another example, a DC offset component may be calculated based on a maximum value Max or a minimum value Min of an amplitude of the waveform. An a-phase/two-phase conversion module 21 serving as a phase signal conversion module converts the signals corresponding to "a" phases from the "a" magnetic detection elements 4 into two-phase signals including a sine wave and a cosine wave.

Now, an example of signal conversion in a case of a=3, that is, three-phase signals A, B, and C is shown in Expression (1) given below. Through this conversion, α and β being signals having phases different from each other by 90 degrees are obtained, and the signals can thus be converted into a sine wave and a cosine wave. Further, in Expression (1) given below, the angles are set to 0, 120, and 240 degrees, but when phases of original waveforms differ from those angles, it is desired that the angles of Expression (1) be set to the same phases as those of the original waveforms.

$$\begin{bmatrix}\alpha\\\beta\end{bmatrix}=\begin{bmatrix}\cos 0 & \cos(120) & \cos(240)\\\sin 0 & \sin(120) & \sin(240)\end{bmatrix}\begin{bmatrix}A\\B\\C\end{bmatrix}=\begin{bmatrix}1 & -\frac{1}{2} & -\frac{1}{2}\\0 & \frac{\sqrt{3}}{2} & -\frac{\sqrt{3}}{2}\end{bmatrix}\begin{bmatrix}A\\B\\C\end{bmatrix} \quad (1)$$

A rotation angle calculation module 22 calculates an arctan of the two-phase signals including the sine wave and the cosine wave to calculate a rotation angle. For reference, the arctan can be calculated based on Expression (2) given below. This follows the general idea of trigonometric functions.

$$\theta=\tan^{-1}\frac{\sin\theta}{\cos\theta} \quad (2)$$

The above-mentioned method, in which the sum of phase signals is obtained and a value obtained by dividing the sum by the number of phases is subtracted from each phase signal, may be provided as a separate step in addition to removing of a DC offset component. Through execution of this step as a separate step, electrical noise and magnetic noise that are input simultaneously to each sensor can be removed. With this, an influence due to an external factor is reduced, to thereby reduce an angle error. Thus, a highly robust sensor can be obtained. A display processing module 23 displays the obtained rotation angle on the display unit 30.

Figure 5:
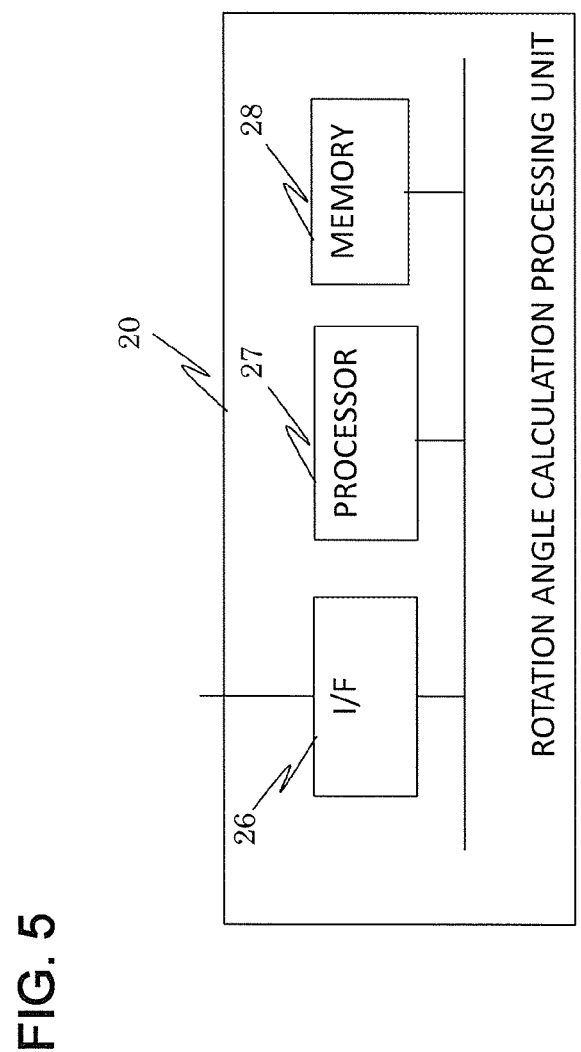
FIG. 5 is a diagram for illustrating an example of a hardware configuration of the rotation angle calculation processing unit of FIG. 3.

FIG. 5 is a diagram for illustrating an example of a hardware configuration of the rotation angle calculation processing unit of FIG. 3. The rotation angle calculation processing unit 20 is constructed of, for example, a computer. The detection signals from the "a" magnetic detection elements 4 corresponding to "a" phases, which have been subjected to digital conversion, are input to the rotation angle calculation processing unit 20 via an interface (I/F) 26. In a memory 28, programs corresponding to the respective functional blocks illustrated in FIG. 4 and preset data to be used for calculation are stored. A processor 27 performs rotation angle calculation processing on the detection signals input via the interface (I/F), in accordance with the programs and data stored in the memory 28. Then, the calculated rotation angle is output via the interface (I/F) 26, and is displayed on the display unit 30 of FIG. 3.

Referring back to FIG. 1, the rotor 2 is made of a magnetic material. The stator 1 includes one bias magnetic field generation portion 3 and the plurality of magnetic detection elements 4 each configured to detect a magnetic density. The bias magnetic field generation portion 3 is constructed of, for example, a permanent magnet. The magnetic detection element 4 is constructed of an electromagnetic conversion element, for example, a Hall device. Further, the rotation angle of the rotor 2 is calculated by the rotation angle calculation processing unit 20 based on the detection signals detected by the magnetic detection elements 4.

An amount of magnetic flux from the bias magnetic field generation portion 3 toward the rotor 2 side changes depending on a distance of a gap between the bias magnetic field generation portion 3 and a surface of the convex and concave portions 2a of the rotor 2. A change in magnetic field caused in association with the bias magnetic field of the bias magnetic field generation portion 3 due to protrusions and recesses of the convex and concave portions 2a, which change smoothly and periodically, is detected by the magnetic detection elements 4. Thus, the detection signal obtained by each of the magnetic detection elements 4 changes depending on the shape of the convex and concave portions 2a, and consequently changes depending on a rotation angle position of the rotor. Further, the change follows the shape of the convex and concave portions 2a, and becomes sine wave signals having different phases in this case. Further, the detection signals obtained by two magnetic detection elements 4 that are separated from each other by a ¼ cycle of one cycle of the convex and concave portions, that is, by 90 degrees, have a relationship of a sine wave and a cosine wave. Then, through calculation of an arctan of those detection signals having a relationship of a sine wave and a cosine wave, a rotation angle position of the rotor 2 is obtained.

On the surface of the rotor 2 that is opposed to the stator, the convex and concave portions 2a, which change in "x" cycles for the mechanical angle of 360 degrees, are formed, where "x" represents an integer of 1 or more. That is, on the surface of the rotor 2 that is opposed to the stator, it is only required that the convex and concave portions 2a in which protrusions and recesses are repeated in one or more cycles during one rotation of the rotor 2 be formed. In FIG. 1 and FIG. 2A and FIG. 2B, the convex and concave portions 2a in the case of x=12, that is, having twelve cycles of protrusions and recesses are illustrated. The convex and concave portions 2a have a shape that changes in a curved manner, which enables each of the magnetic detection elements 4 to obtain a substantially sine wave or a sine wave. Thus, the convex and concave portions 2a have, for example, a shape of a substantially sine wave or a sine wave. There are arranged "a" magnetic detection elements 4 of the stator 1 along a circumferential direction of the stator 1 at equal intervals for one cycle of the convex and concave portions so as to be opposed to, with a gap from, the surface of the rotor 2 that is opposed to the stator. In FIG. 1 and FIG. 2A, a=3, that is, three magnetic detection elements 4 are arranged. The bias magnetic field generation portion 3 extends in the circumferential direction for one cycle of the convex and concave portions 2a so as to overlap with the "a" magnetic detection elements 4. The bias magnetic field generation portion 3 is also arranged so as to be opposed to, with a gap from, the surface of the rotor 2 that is opposed to the stator. The symbol "a" represents an integer of 2 or more.

For example, when a=2, that is, two magnetic detection elements 4 are arranged as illustrated in FIG. 2B, the magnetic detection elements 4 are arranged at an interval of a substantially fourth cycle or a fourth cycle of one cycle of the convex and concave portions 2a. In this case, processing by the a-phase/two-phase conversion module 21 of the rotation angle calculation processing unit 20 is not required. The rotation angle calculation module 22 calculates an arctan of two-phase signals including sine-wave and cosine-wave detection signals detected by the magnetic detection elements 4 to calculate a rotation angle.

When a>2, for example, three magnetic detection elements 4 are arranged as illustrated in FIG. 2A, the magnetic detection elements 4 are each arranged at a position of 360/(x×a) degrees in the circumferential direction. In this case, the a-phase/two-phase conversion module 21 of the rotation angle calculation processing unit 20 performs processing of converting the detection signals corresponding to "a" phases into two-phase signals that are separated by a fourth cycle of one cycle of the convex and concave portions 2a. In the case of a=3 as illustrated in FIG. 1 and FIG. 2A, processing of converting the detection signals corresponding to three phases into two-phase detection signals is performed. Then, the rotation angle calculation module 22 calculates an arctan of the two-phase signals including sine-wave and cosine-wave signals, which are obtained by the a-phase/two-phase conversion module 21, to calculate a rotation angle.

Further, on the outer peripheral side of the bias magnetic field generation portion 3 or outer sides thereof in the circumferential direction, the magnetic material 5 for increasing an amount of magnetic flux to be detected by the magnetic detection elements 4 is arranged so as to be opposed to, with a gap from, the surface of the rotor 2 that is opposed to the stator. This magnetic material 5 may be arranged on the outer peripheral side of the bias magnetic field generation portion 3 as indicated by reference symbol 5a of FIG. 2A and FIG. 2B. Further, as indicated by reference symbols 5b and 5c of FIG. 2A and FIG. 2B, the magnetic materials 5 may be arranged so as to extend from end portions of the bias magnetic field generation portion 3 in the circumferential direction toward the outer sides thereof in the circumferential direction. The magnetic material 5 may be arranged on only one end side of the bias magnetic field generation portion 3 in the circumferential direction, or may be arranged on both end sides of the bias magnetic field generation portion 3 in the circumferential direction.

A portion of the magnetic material 5 that extends from the end portion of the bias magnetic field generation portion 3 in the circumferential direction toward the outer side thereof in the circumferential direction is set to have a length equal to or larger than half of a length of the bias magnetic field generation portion 3 in the circumferential direction. In this manner, it is possible to efficiently increase an amount of magnetic flux to be detected by the magnetic detection elements 4.

In the embodiment described above, a description has been given of the case of the configuration in which the rotor 2 is arranged inside and the stator 1 is arranged outside. However, the present invention is not limited thereto, and is also applicable to a case of a configuration in which the stator 1 is arranged inside and the rotor 2 is arranged outside. Further, the present invention is not limited to the above-mentioned configuration examples.

Figure 6:
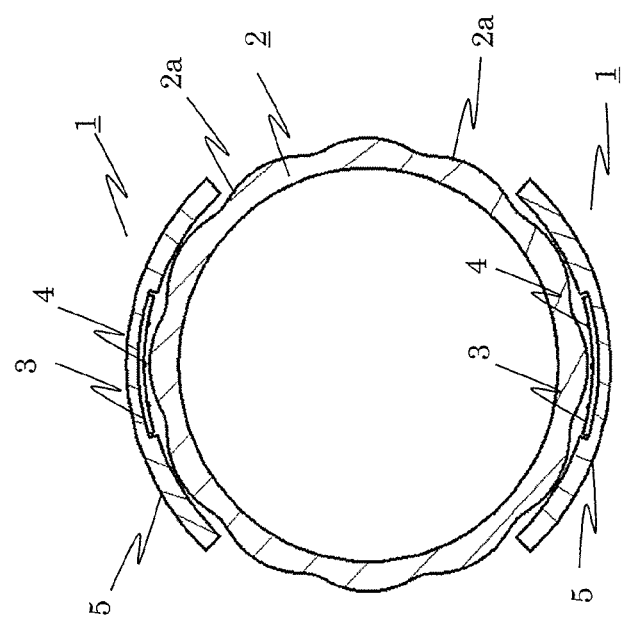
FIG. 6 is a schematic sectional view of another example of the detection unit of the rotation angle detection device according to the present invention.
Figure 7:
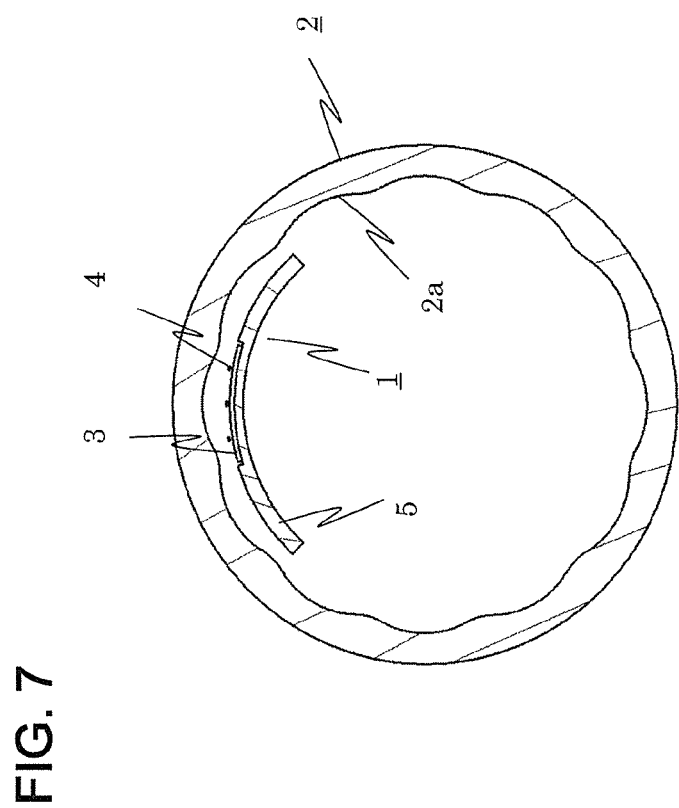
FIG. 7 is a schematic sectional view of still another example of the detection unit of the rotation angle detection device according to the present invention.
Figure 8:
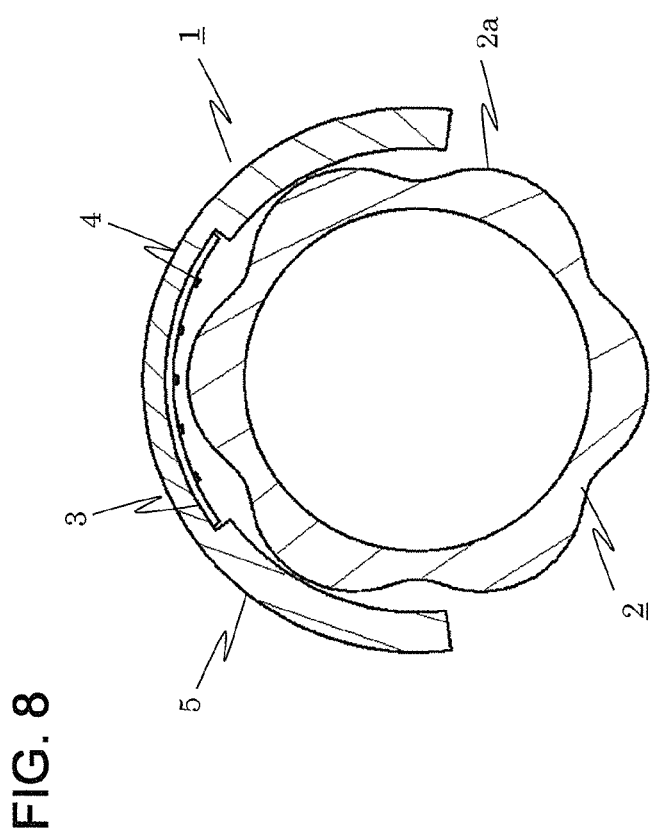
FIG. 8 is a schematic sectional view of still another example of the detection unit of the rotation angle detection device according to the present invention.

FIG. 6 to FIG. 8 are each a schematic sectional view of another configuration example of the detection unit of the rotation angle detection device according to the present invention.

FIG. 6 is an illustration of a configuration in which there are arranged two stators 1 each including one bias magnetic field generation portion 3, the plurality of magnetic detection elements 4, and the magnetic material 5. In the present invention, a plurality of stators 1 may be arranged. In this case, in the rotation angle calculation module 22 of the rotation angle calculation processing unit 20, for example, a rotation angle is calculated for each of the stators 1, and an average value of the calculated rotation angles is set as a final rotation angle.

FIG. 7 is an illustration of a configuration of a case of an outer-rotor structure, in which the rotor 2 is arranged outside. In each of the examples described above, the case of the inner-rotor structure, in which the rotor 2 is arranged inside, has been described. However, the present invention is also applicable to a case of the outer-rotor structure, in which the rotor 2 is arranged outside.

FIG. 8 is an illustration of a configuration in which the rotor 2 has x=6, that is, six convex and concave portions 2a for the mechanical angle of 360 degrees, and the stator 1 is provided with a=5, that is, five magnetic detection elements 4 for one cycle of the convex and concave portions 2a of the rotor 2. In the present invention, the rotor 2 is only required to have the convex and concave portions 2a corresponding to "x" cycles for the mechanical angle of 360 degrees, where "x" represents an integer of 1 or more. Further, the stator 1 is only required to have "a" magnetic detection elements 4 for one cycle of the convex and concave portions 2a of the rotor 2, where "a" represents an integer of 2 or more.

INDUSTRIAL APPLICABILITY

The rotation angle detection device and the rotation angle detection method according to the present invention are applicable to detection of a rotation angle of a rotary member in various fields.

REFERENCE SIGNS LIST 1 stator, 2 rotor, 2a convex and concave portion, 3 bias magnetic field generation portion, 4 magnetic detection element, 5 magnetic material, 10 A/D conversion unit, 20 rotation angle calculation processing unit, 21 a-phase/two-phase conversion module, 22 rotation angle calculation module, 23 display processing module, 24 signal conversion module, 26 interface (I/F), 27 processor, 28 memory, 30 display unit

The invention claimed is:

1. A rotation angle detection device, comprising:
a rotor made of a magnetic material;
a stator including one bias magnetic field generation portion and a plurality of magnetic detection elements;
a processor to execute a program; and
a memory to store the program which, when executed by the processor, performs a process of calculating a rotation angle of the rotor based on detection signals obtained by the plurality of magnetic detection elements,
wherein a surface of the rotor that is opposed to the stator has convex and concave portions, which change in "x" cycles for a mechanical angle of 360 degrees, where "x" represents an integer of 1 or more, and the convex and concave portions have a shape that changes in a curved manner, the shape enabling each of the plurality of magnetic detection elements to obtain a substantially sine wave, and
wherein "a" magnetic detection elements of the stator are arranged along a circumferential direction of the stator at equal intervals for one cycle of the convex and concave portions so as to be opposed to, with a gap from, the surface of the rotor that is opposed to the stator, and the one bias magnetic field generation portion extends in the circumferential direction for one cycle of the convex and concave portions so as to overlap with the "a" magnetic detection elements, where "a" represents an integer of 2 or more.

2. The rotation angle detection device according to claim 1, wherein when a=2 and a number of magnetic detection elements are two, the magnetic detection elements are arranged at an interval of a substantially fourth cycle of one cycle of the convex and concave portions.

3. The rotation angle detection device according to claim 2, wherein the process of calculating the rotation angle of the rotor including a process of detecting the rotation angle based on two-phase signals detected by the magnetic detection elements.

4. The rotation angle detection device according to claim 3, wherein the magnetic material includes a magnetic material arranged on an outer side in the circumferential direction of an end portion of the one bias magnetic field generation portion in the circumferential direction.

5. The rotation angle detection device according to claim 3, wherein the magnetic material includes magnetic materials arranged on outer sides in the circumferential direction of respective end portions of the one bias magnetic field generation portion in the circumferential direction.

6. The rotation angle detection device according to claim 2, wherein the magnetic material includes a magnetic material arranged on an outer side in the circumferential direction of an end portion of the one bias magnetic field generation portion in the circumferential direction.

7. The rotation angle detection device according to claim 6, wherein a portion of the magnetic material that extends from the end portion of the one bias magnetic field generation portion in the circumferential direction toward the outer side in the circumferential direction has a length equal to or larger than half of a length of the one bias magnetic field generation portion in the circumferential direction.

8. The rotation angle detection device according to claim 2, wherein the magnetic material includes magnetic materials arranged on outer sides in the circumferential direction of respective end portions of the one bias magnetic field generation portion in the circumferential direction.

9. The rotation angle detection device according to claim 8, wherein a portion of the magnetic material that extends from the end portion of the one bias magnetic field generation portion in the circumferential direction toward the outer side in the circumferential direction has a length equal to or larger than half of a length of the one bias magnetic field generation portion in the circumferential direction.

10. The rotation angle detection device according to claim 1, wherein when a>2 and a number of magnetic detection elements are three or more, the magnetic detection elements are each arranged at a position of 360/(x×a) degrees in the circumferential direction.

11. The rotation angle detection device according to claim 10, wherein the process of calculating the rotation angle of the rotor including processes of converting a-phase detection signals detected by the plurality of magnetic detection elements into two-phase signals that are separated by a fourth cycle of one cycle of the convex and concave portions, and calculating the rotation angle based on the two-phase signals.

12. The rotation angle detection device according to claim 11, wherein the magnetic material includes a magnetic material arranged on an outer side in the circumferential direction of an end portion of the one bias magnetic field generation portion in the circumferential direction.

13. The rotation angle detection device according to claim 11, wherein the magnetic material includes magnetic materials arranged on outer sides in the circumferential direction of respective end portions of the one bias magnetic field generation portion in the circumferential direction.

14. The rotation angle detection device according to claim 10, wherein the magnetic material includes a magnetic material arranged on an outer side in the circumferential direction of an end portion of the one bias magnetic field generation portion in the circumferential direction.

15. The rotation angle detection device according to claim 10, wherein the magnetic material includes magnetic materials arranged on outer sides in the circumferential direction of respective end portions of the one bias magnetic field generation portion in the circumferential direction.

16. The rotation angle detection device according to claim 1, wherein the magnetic material includes a magnetic material arranged on an outer side in the circumferential direction of an end portion of the one bias magnetic field generation portion in the circumferential direction.

17. The rotation angle detection device according to claim 16, wherein a portion of the magnetic material that extends from the end portion of the one bias magnetic field generation portion in the circumferential direction toward the outer side in the circumferential direction has a length equal to or larger than half of a length of the one bias magnetic field generation portion in the circumferential direction.

18. The rotation angle detection device according to claim 1, wherein the magnetic material includes magnetic materials arranged on outer sides in the circumferential direction of respective end portions of the one bias magnetic field generation portion in the circumferential direction.

19. The rotation angle detection device according to claim 18, wherein a portion of the magnetic material that extends from the end portion of the one bias magnetic field generation portion in the circumferential direction toward the outer side in the circumferential direction has a length equal to or larger than half of a length of the one bias magnetic field generation portion in the circumferential direction.

20. A rotation angle detection method, comprising:
arranging, to a rotor made of a magnetic material, a stator including one bias magnetic field generation portion and a plurality of magnetic detection elements with a gap between the stator and the rotor;
forming, on a surface of the rotor that is opposed to the stator, convex and concave portions, which change in "x" cycles for a mechanical angle of 360 degrees, where "x" represents an integer of 1 or more, the convex and concave portions having a shape that changes in a curved manner, the shape enabling each of the plurality of magnetic detection elements to obtain a substantially sine wave;
arranging "a" magnetic detection elements of the stator along a circumferential direction of the stator at equal intervals for one cycle of the convex and concave portions so as to be opposed to, with a gap from, the surface of the rotor that is opposed to the stator, the one bias magnetic field generation portion extending in the circumferential direction for one cycle of the convex and concave portions so as to overlap with the "a" magnetic detection elements, where "a" represents an integer of 2 or more; and
calculating a rotation angle of the rotor based on detection signals obtained by the plurality of magnetic detection elements.

* * * * *